United States Patent
Morphet

(10) Patent No.: US 9,922,450 B2
(45) Date of Patent: *Mar. 20, 2018

(54) GRAPHICS RENDERER AND METHOD FOR RENDERING 3D SCENE IN COMPUTER GRAPHICS USING OBJECT POINTERS AND DEPTH VALUES

(71) Applicant: Imagination Technologies Limited, Kings Langley (GB)

(72) Inventor: Stephen Morphet, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/376,323

(22) Filed: Dec. 12, 2016

(65) Prior Publication Data

US 2017/0091987 A1 Mar. 30, 2017

Related U.S. Application Data

(63) Continuation of application No. 14/182,917, filed on Feb. 18, 2014, now Pat. No. 9,552,666, which is a (Continued)

(30) Foreign Application Priority Data

Jul. 24, 2001 (GB) .................................. 01180256

(51) Int. Cl.
*G06T 15/40* (2011.01)
*G06T 15/00* (2011.01)

(52) U.S. Cl.
CPC .......... *G06T 15/405* (2013.01); *G06T 15/005* (2013.01)

(58) Field of Classification Search
CPC ............................. G06T 15/40; G06T 15/405
See application file for complete search history.

(56) References Cited

U.S. PATENT DOCUMENTS 5,600,763 A * 2/1997 Greene .................. G06T 15/06
345/420
5,729,672 A 3/1998 Ashton
(Continued)

FOREIGN PATENT DOCUMENTS

| JP | 08-255262 A | 10/1996 |
| JP | 11-144074 A | 5/1999 |
| WO | 00/28481 A | 5/2000 |

OTHER PUBLICATIONS

Law et al., "CellFlow: A Parallel Rendering Scheme for Distributed Memory Architectures," Proceedings of the International Conference on Parallel and Distributed Processing Techniques and Applications, PDPTA '95, Athens, GA, Nov. 1995, pp. 3-12.

*Primary Examiner* — Daniel Hajnik
(74) *Attorney, Agent, or Firm* — Vorys, Sater, Seymour and Pease LLP; Vincent M. DeLuca

(57) ABSTRACT

An apparatus and a method for generating 3-dimensional computer graphic images. The image is first sub-divided into a plurality of rectangular areas. A display list memory is loaded with object data for each rectangular area. The image and shading data for each picture element of each rectangular area are derived from the object data in the image synthesis processor and a texturizing and shading processor. A depth range generator derives a depth range for each rectangular area from the object data as the imaging and shading data is derived. This is compared with the depth of each new object to be provided to the image synthesis processor and the object may be prevented from being provided to the image synthesis processor independence on the result of the comparison.

20 Claims, 8 Drawing Sheets

Related U.S. Application Data continuation of application No. 11/999,133, filed on Dec. 4, 2007, now Pat. No. 8,686,998, which is a continuation of application No. 11/336,685, filed on Jan. 20, 2006, now abandoned, which is a continuation of application No. 10/202,220, filed on Jul. 24, 2002, now abandoned.

(56) References Cited

U.S. PATENT DOCUMENTS

| | | |
|---|---|---|
| 5,867,166 A | 2/1999 | Myhrvold et al. |
| 6,037,946 A | 3/2000 | Takeda |
| 6,084,591 A | 7/2000 | Aleksic |
| 6,104,417 A | 8/2000 | Nielsen et al. |
| 6,115,047 A | 9/2000 | Deering |
| 6,313,839 B1 | 11/2001 | Larson |
| 6,377,258 B1 * | 4/2002 | Lewis ............... G06T 15/005 345/419 |
| 6,380,935 B1 | 4/2002 | Heeschen et al. |
| 6,407,736 B1 | 6/2002 | Regan |
| 6,697,063 B1 | 2/2004 | Zhu |
| 6,717,576 B1 | 4/2004 | Duluk et al. |
| 6,798,410 B1 | 9/2004 | Redshaw et al. |
| 6,856,320 B1 | 2/2005 | Rubinstein et al. |
| 6,961,057 B1 | 11/2005 | Van Dyke et al. |
| 7,102,646 B1 | 9/2006 | Rubinstein et al. |
| 7,170,515 B1 | 1/2007 | Zhu |
| 7,310,100 B2 | 12/2007 | Hussain |
| 7,719,539 B2 | 5/2010 | Morphet |
| 2002/0015055 A1 | 2/2002 | Foran |
| 2002/0039100 A1 | 4/2002 | Morphet |
| 2004/0155878 A1 | 8/2004 | Inazumi |
| 2004/0222996 A1 | 11/2004 | Fraser |
| 2004/0233207 A1 | 11/2004 | Morphet |
| 2005/0057571 A1 | 3/2005 | Stevens |
| 2005/0122338 A1 | 6/2005 | Hong et al. |
| 2005/0285867 A1 | 12/2005 | Brunner et al. |
| 2007/0146378 A1 | 6/2007 | Sorgard et al. |

\* cited by examiner

GRAPHICS RENDERER AND METHOD FOR RENDERING 3D SCENE IN COMPUTER GRAPHICS USING OBJECT POINTERS AND DEPTH VALUES

CROSS-REFERENCE TO RELATED APPLICATIONS

This application is a continuation of co-pending application Ser. No. 11/336,685, filed Jan. 20, 2006, which is a continuation of Ser. No. 10/202,220, filed Jul. 24, 2002, the disclosures of which are incorporated herein by reference in their entirety.

FIELD OF THE INVENTION

This invention relates to 3-dimensional computer graphics systems and in particular to systems of the type described in our British patent numbers 2282682 and 2298111.

BACKGROUND OF THE INVENTION

British patent number 2282682 describes a system that uses a ray casting method to determine the visible surfaces in a scene composed of a set of infinite planar surfaces. An improvement to the system is described in UK Patent Application number 2298111, in which the image plane is divided into a number of rectangular tiles. Objects are stored in a display list memory, with 'object pointers' used to associate particular objects with the tiles in which they may be visible. The structure of this system is shown in FIG. 1.

In FIG. 1, the Tile Accelerator 2 is the part of the system that processes the input data, performs the tiling calculations, and writes object parameter and pointer data to the display list memory 4. The layout of data in the display list memory is as shown in. FIG. 2. There are numerous possible variations on this, but essentially, there is one list of object pointers per tile, and a number of object parameter blocks, to which the object pointers point. The layout of objects in the display list memory is shown in FIG. 2, The top part of the diagram shows the basic system, with parameters stored for two objects, A and B. Object A is visible in tiles 1, 2, 5, 6, and 7, and so five object pointers are written. Object B is visible only in tiles 3 and 7, so only two object pointers are written. It can be seen that the use of object pointers means that the object parameter data can be shared between tiles, and need not be replicated when the objects fall into more than one tile. It also means that the Image Synthesis Processor 6 of FIG. 1 (ISP) is able to read the parameters for only the objects that may be visible in that tile. It does this using the ISP Parameter Fetch unit 8. In the example of FIG. 2, the ISP would read only the parameters for object B when processing tile 3, but would read the parameters for both objects when processing tile 7. It would not be necessary to read data for tile 4. The lower part of FIG. 2 shows the memory layout that is used with the macro tiling Parameter management system, which is described later.

When the Tile Accelerator has built a complete display list, the Image Synthesis Processor (ISP) 6 begins to process the scene. The ISP Parameter Fetch unit 8 processes each tile in turn, and uses the object pointer list to read only the parameter data relevant to that tile from the display list memory 4. The ISP then performs hidden surface removal using a technique known as 'Z-buffering' in which the depth values of each object are calculated at every pixel in the tile, and are compared with the depths previously stored. Where the comparison shows an object to be closer to the eye than the previously stored value the identity and depth of the new object are used to replace the stored values. When all the objects in the tile have been processed, the ISP 6 sends the visible surface information to the Texturing and Shading Processor (TSP) 10 where it is textured and shaded before being sent to a frame buffer for display.

An enhancement to the system described above is described in UK Patent Application number 0027897.8. The system is known as 'Parameter Management' and works by dividing the scene into a number of 'partial renders' in order to reduce the display list memory size required. This method uses a technique known as 'Z Load and Store' to save the state of the ISP after rendering a part of the display list. This is done in such a way that it is possible to reload the display list memory with new data and continue rendering the scene at a later time. The enhancement therefore makes it possible to render arbitrarily complex scenes with reasonable efficiency while using only a limited amount of display list memory.

As 3D graphics hardware has become more powerful the complexity of the images being rendered has increased considerably, and can be expected to continue to do so. This is a concern for display list based rendering systems such as the one discussed above because a large amount of fast memory is required for the storage of the display list. Memory bandwidth is also a scarce resource. Depending upon the memory architecture in use, the limited bandwidth for writing to and reading from the display list memory may limit the rate at which data can be read or written, or it may have an impact on the performance of other subsystems which share the same bandwidth, e.g. texturing.

Embodiments of the present invention address these problems by examining the depth ranges of objects and tiles, and culling objects from the scene that can be shown not to contribute to the rendered result.

Embodiments of the invention use the depth values stored in the ISP to compute a range of depth values for the whole tile. By comparing the depths of objects with the range of stored depth values it is possible to cull objects that are guaranteed to be invisible without needing to process them in the ISP.

The Parameter Management system referred to above allows renders to be performed in a limited amount of memory, but it can have a significant impact on performance compared to a system with a sufficient amount of real memory.

Embodiments of the invention mitigate the inefficiencies of the Parameter Management system by culling objects before they are stored in the display list. Reducing the amount of data stored in the display list means that fewer partial renders are required to render the scene. As the number of partial renders is reduced, the significant memory bandwidth consumed by the Z Load and Store function is also reduced.

To perform this type of culling the Tile Accelerator compares incoming objects with information about the range of depths stored in the ISP during previous partial renders.

FIG. 3, shows a graph, illustrating the depths for a previous partial render and for a new object to be rendered. The new object lies within a depth range of 0.7 to 0.8, and during the previous partial render all pixels in a tile were set to values between 0.4 and 0.6. There is no way that the object can be visible since it is further away and therefore occluded by the objects drawn previously. Therefore the object need not be stored in the display list memory since it cannot contribute to the image.

A second stage of culling, in the parameter fetch stage of the ISP, occurs in a further embodiment. This is at the point at which object pointers are dereferenced, and parameter data is read from the display list memory. This works on a very similar principle to the first stage culling shown in FIG. 3. By storing a little additional information in the object pointer, and by testing this against depth range information maintained in the ISP, it is possible to avoid reading the parameter data for some objects altogether. This type of culling reduces the input bandwidth to the ISP, and the number of objects that the ISP must process, but it does not reduce the amount of data written into the display list memory.

Unlike the first stage of culling, the second stage works with object pointers that correspond to the tile that is currently being processed by the ISP. The ISP's depth range information can be updated more quickly, and more accurately, than the range information used in the first stage culling, and this allows objects to be culled that were passed by the first stage.

The invention is defined in its various aspects in the appended claims to which reference should now be made.

BRIEF DESCRIPTION OF THE DRAWINGS

Specific embodiments of the invention will now be described in detail by way of example with reference to the accompanying drawings in which.

DETAILED DESCRIPTION

Figure 1:
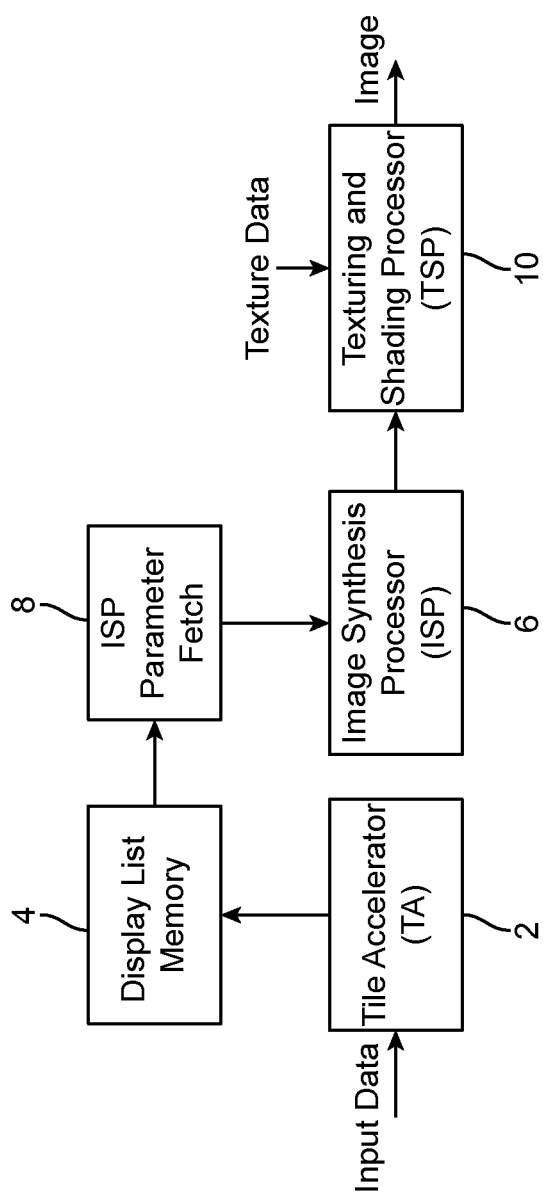
FIG. 1 shows a known system.
Figure 4:
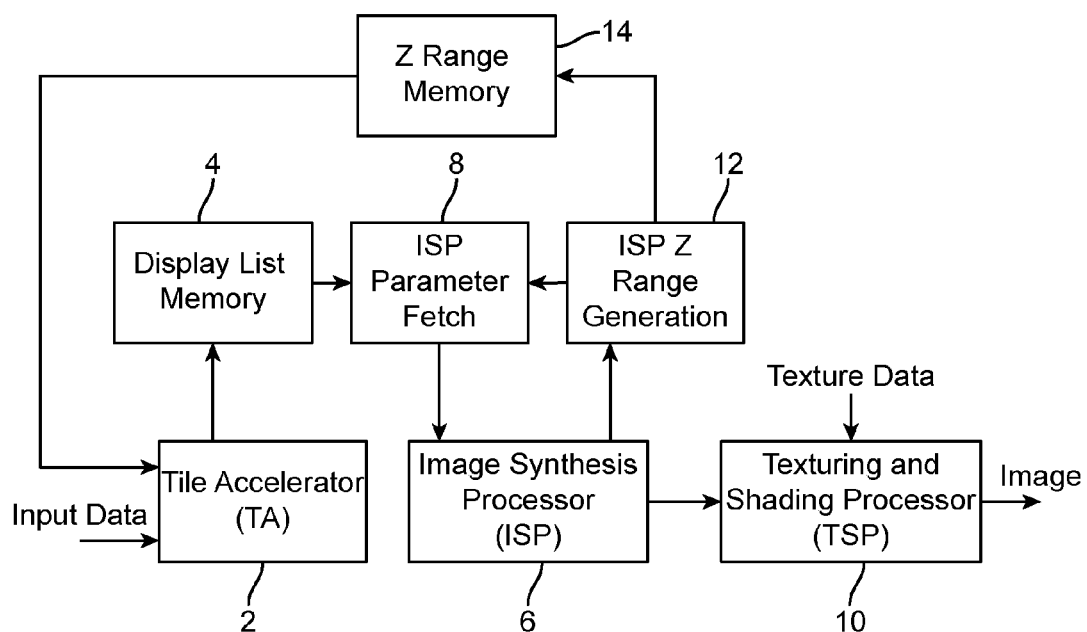
FIG. 4 is a block diagram of an embodiment of the invention.

FIG. 4 is an expanded and modified version of the block diagram of FIG. 1. The ISP Z range generation unit 12 computes the range of Z values stored in the ISP 6 and feeds it back to the first stage of culling, located in the TA2, via the Z range memory 14. A second feedback path sends Z range data to the second stage of culling, located in the ISP parameter fetch unit 8.

ISP Range Generation

Figure 5:
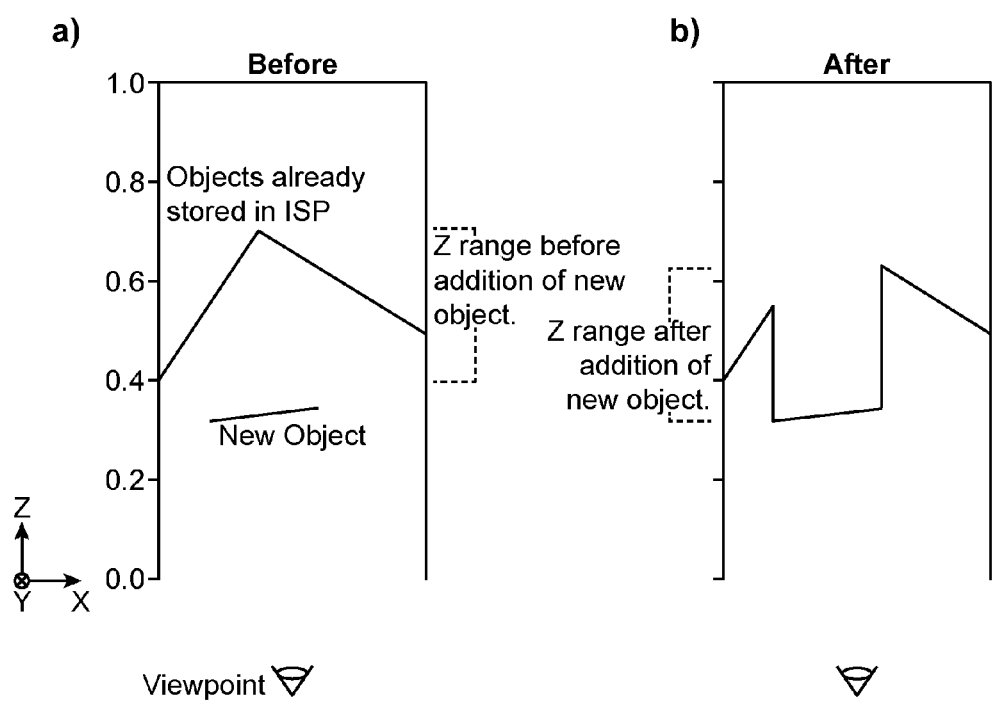
FIGS. 5a) and b) shows graphically how stored depth range changes as objects are processed.

The embodiment described uses a range of depths that represent the minimum and maximum depths of the objects stored in the ISP 6. This range is computed in the ISP as objects are processed, and represents the actual range of depth values that are stored in the tile at that moment. This range has to be updated constantly, as stored values are continually being replaced and the range may grow and shrink as the scene is rendered. FIGS. 5a) and b) show respectively before and after a situation in which an incoming object is rendered into the pixels which previously determined the maximum Z value of the tile, thus causing both the minimum and maximum depth values to be reduced.

Figure 6:
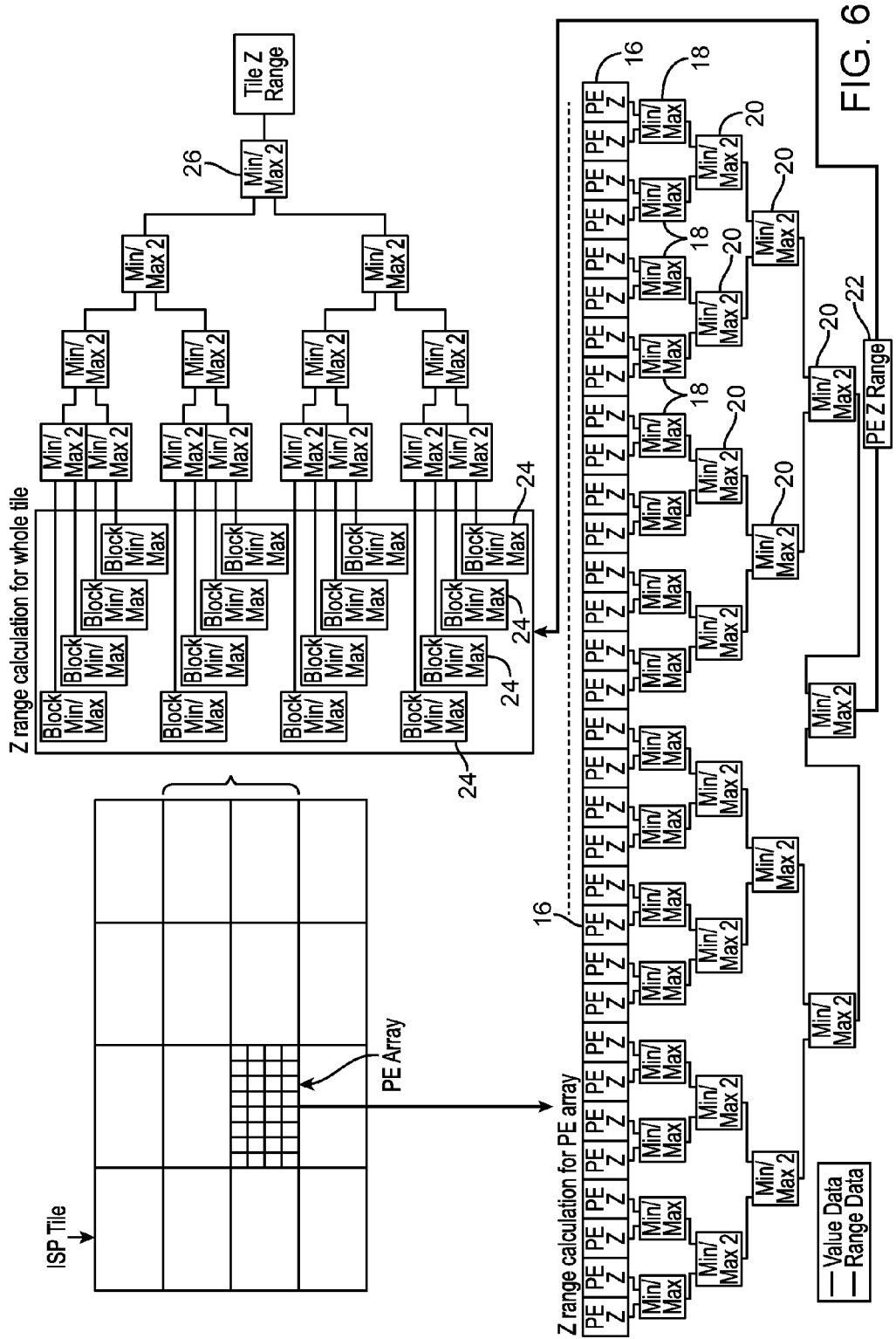
FIG. 6 shows a block diagram of the comparator arrays required to derive the depth range in an embodiment of the invention.
Figure 6A:
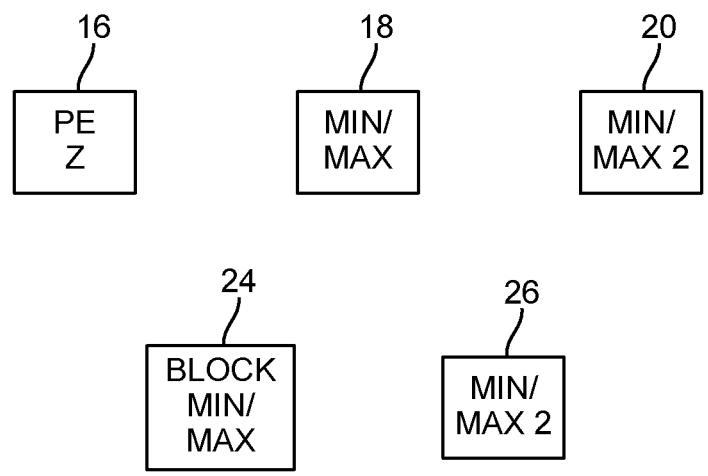
FIG. 6A shows enlarged views of certain cells from FIG. 6.

The ISP 6 contains storage for each pixel in the tile, which may vary in size depending on the particular implementation of the technology. A typical tile size might be 32.times.16 pixels. The ISP also contains a number of PEs (Processor Elements) which are hardware units which operate in parallel to perform the functions of the ISP by determining depth values at each pixel. Typically there are fewer PEs than there are pixels in the tile. For example, there may be 32 PEs arranged as a grid of 8.times.4 pixels. In this case 32 (8.times.4) pixels can be computed simultaneously, and the PEs will perform the computations up to 16 (4.times.4) times at fixed locations within the tile in order to process an entire object. FIG. 6 shows a possible arrangement of PEs 16 within a tile, as well as the comparator structures described below.

To compute the range of depths the PEs compute the range of depths for the set of pixels on which they are currently working. This range, together with range information from the other possible PE positions, is then used to update the overall depth range for the tile. A typical implementation would use comparators in tree structures to find the range of values stored in a set of pixels. For example, a set of 32 PEs would require 16+2.times. (8+4+2+1)=46 comparators to calculate both the maximum and minimum values. This tree structure can be seen at the bottom of FIG. 6. In this diagram, blocks marked "Min/Max" 18 contain one comparator to determine the minimum and maximum of two input values from two PEs 16, and blocks marked "Min/Max 2" 20 contain a pair of comparators, in order to compute the minimum and maximum of two input ranges. The output of the comparator tree is a pair of values representing the minimum and maximum set of depth values in those 32 pixels, which is stored in memory associated with that particular set of pixels.

Each Min/Max block 18 is coupled to the outputs of two of the PEs 16 and compares the minimum and maximum values output by these elements and stores these in its memory, passing a range to the Min/Max 2 unit 20. The Min/Max 2 unit 20 receives input from a second Min/Max unit 18 and passes the output to the next Min/Max 2 unit 20 in the tree. All PE ranges ultimately feed into a single Min/Max 2 unit 20 at the bottom of the tree. This gives a PE Z range output 22 for the array of 32 PEs 16.

Once the PEs have computed a polygon in all areas of the tile, i.e. at every pixel, it is necessary to combine the stored depth values into a single value for the whole tile. Again, a tree of comparators may be used. In the case of the 32.times.16 tile, there are 16 sets of ranges to be reduced to one, and so 2.times. (8+4+2+1)=30 comparators are required. This structure is shown at the top-right of FIG. 6, where each "Min/Max 2" block 20 contains a pair of comparators. The output of the final pair of comparators 26 gives the range of depth values for the whole tile, updated with the depths of the triangle that has just been processed. The inputs to the tree are the block Min/Max range memories 24 which store range information corresponding to each of the PE array positions. These memories are updated with the PE Z range data 22 after the PE array has been processed.

The comparators 18, 20, 26 of FIG. 6 and the other Z range generation circuiting are all contained within the ISP Z range generation unit 12 in FIG. 4. Thus, this generates and stores the Z range for the whole tile.

It is also necessary to know whether a valid depth value has been stored at every pixel in the ISP. Normally there is a polygon near the beginning of each frame that is used to initialize the values in the Z buffer, however this cannot be relied on. Any uninitialised depth value will obviously affect the validity of any range information, and so this condition must be detected and the range marked as being invalid. Depth based object culling must be avoided until the range information becomes valid.

Precision

The large number of comparators used in the ISP's Z range generation hardware 12 is expensive to build, as it will use a considerable amount of silicon area. In order to reduce the size of the hardware 12 the precision of the calculations can be reduced. For example, while the Z values coming into the ISP can be stored as floating point values with 24 bit mantissas, the Z range comparators can operate on shorter words, e.g. 8 or 16 bit mantissas.

As values are truncated to the smaller word length it is important that the values are rounded appropriately, since it is unlikely that the shorter word will be able to represent the value of the long word precisely. When dealing with ranges, the minimum value must be rounded to the nearest value that is smaller than the original, and the maximum value must be rounded to the nearest value that is larger than the original. In this way, the truncation errors always cause the Z range to expand. Expansion of the Z range reduces the efficiency slightly since fewer objects are found to lie entirely outside the range, but it maintains the correctness of the generated image. If the range is allowed to contract it is found that objects close to the edge of the range are discarded when in fact they should be visible in the image. This is obviously not desirable.

In order to maintain the required precision at the output of a comparator tree it is necessary to use progressively higher levels of precision at higher levels in the tree.

The use of full precision Z range values is also impractical in other parts of the system. For example, in the discussion of the ISP parameter fetch culling stage, it will be seen that at least one value representing the Z range of the object is stored inside the object pointer. For reasons of space efficiency it may be desirable to store a reduced precision value here also. In this case there is little point in the ISP generating a range using more precision than is available in the object pointer values. On the other hand, the culling stage in the tile accelerator benefits from higher precision ranges from the ISP, since it does not have the same storage constraints.

In practice the benefits of higher precision Z range calculations are small, and typically a reduced mantissa length of between 8 and 16 bits will be found to be optimal. The exact sizes used will be determined by the requirements of the particular device being implemented.

Z Range Testing

The minimum and maximum Z values of a polygonal object can be determined easily by examination of the vertex coordinates. When valid range information is available from the ISP in the Z range generation unit 12 it is possible to conditionally cull the object based on comparison of the two ranges of values.

Each object in the score has a "Depth Compare Mode" (DCM) which takes one of eight values and is an instruction that tells the ISP's depth comparison hardware how to decide whether the object passes the depth test at a pixel. The culling test must be modified according to the DCM of the object. The eight possible values of DCM, and the appropriate culling test for each, are shown in Table 1.

TABLE 1

Depth Compare Modes

| DCM | Condition | Culling Test |
|---|---|---|
| DCM_ALWAYS | The object always passes the depth test, regardless of Z values. | N/A |
| DCM_NEVER | The object never passes the depth test, regardless of Z values. | N/A |
| DCM_EQUAL | The object passes the depth test if its z value is equal to the z value stored in the ISP. | Cull if (Obj:Max < ISP:Min) OR (Obj:Min > ISP:Max) |
| DCM_NOT_EQUAL | The object passes the depth test if its z value is not equal to the z value stored in the ISP. | N/A |
| DCM_LESS | The object passes the depth test if its z value is less than the z value stored in the ISP. | Cull if (Obj:Min >= ISP:Max) |
| DCM_LESS_EQ | The object passes the depth test if its z value is less than or equal to the z value stored in the ISP. | Cull if (Obj:Min > ISP:Max) |
| DCM_GREATER | The object passes the depth test if its z value is greater than the z value stored in the ISP. | Cull if (Obj:Max < ISP:Min) |
| DCM_GREATER_EQ | The object passes the depth test if its z value is greater than or equal to the z value stored in the ISP. | Cull if (Obj:Max <= ISP:Min) |

Depth comparisons in the ISP are performed for every pixel in the object for each tile being processed, with depths being iterated across the surface of the polygon. Depth based culling performs a single test per object, and must therefore perform appropriate comparison between suitable ranges of values.

Figure 7:
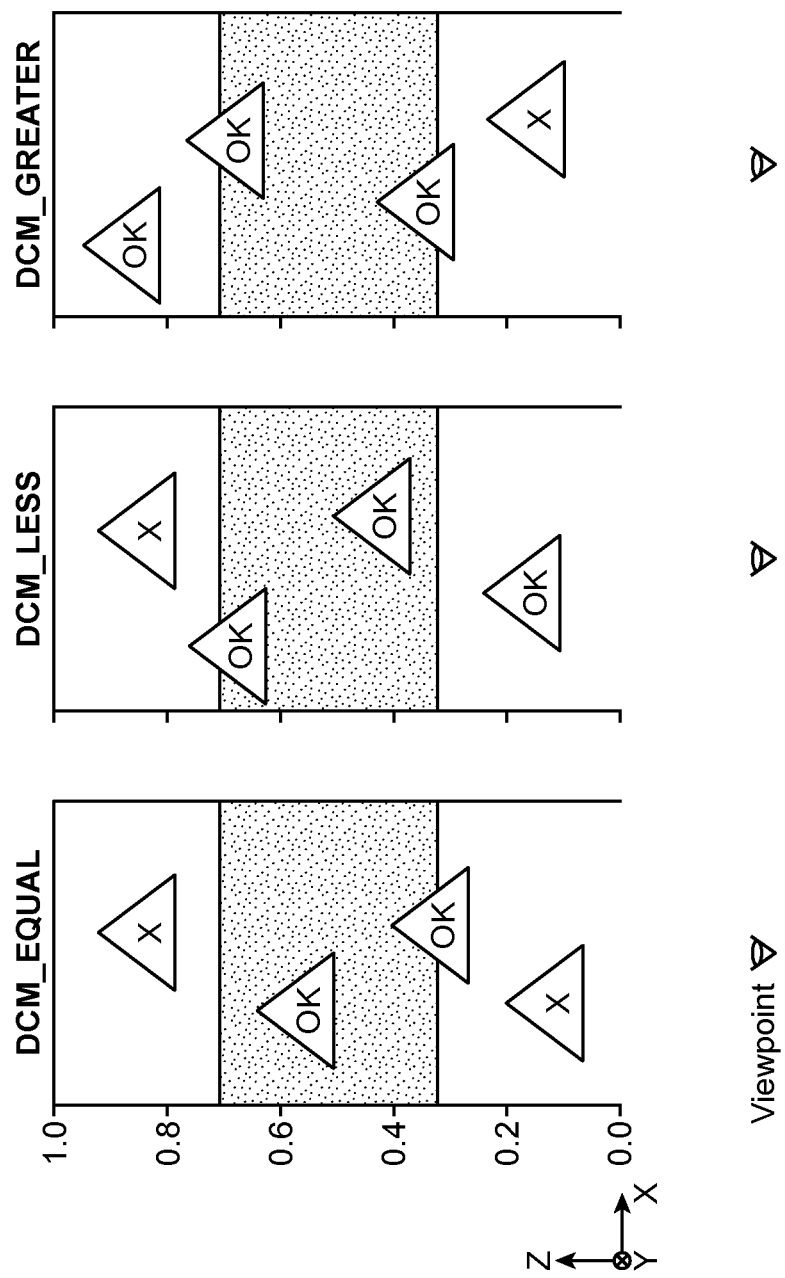
FIG. 7 shows schematically various depth compare modes of operation.

The depth compare mode must be taken into account when performing the depth based culling tests. The diagrams in FIG. 7 show three of the simple conditions that correspond to DCM modes DCM_EQUAL, DCN_LESS, and DCM_GREATER. The shaded areas indicate the range of depths stored in the ISP, which are made available by the Z range generation unit 12 to the culling stages, and the triangles indicate candidates for culling. Triangles marked 'OK' would be passed while triangles marked 'X' would be culled.

In the DCM_EQUAL example, objects will only be stored in the ISP if they have a depth value equal to one of the currently stored depth values. This means that any object with a depth range that intersects the stored range (objects marked 'OK') may pass the depth test and so must not be culled. The objects that do not intersect the stored range (objects marked 'X') cannot possibly pass the depth test, and can therefore be safely culled.

In the DCM_LESS example, objects will be stored in the ISP if they have depth values that are less than the corresponding stored value. Objects with depths that are entirely less than the stored range are very likely to be visible, and are therefore not culled. Objects with depth ranges that intersect wholly or partly with the stored range may also be visible, and are not culled. Only objects whose range is entirely greater than the stored depth range are guaranteed to be completely occluded, and may therefore be culled. These objects are marked with 'X'.

The DCM_GREATER example is the opposite of the DCM_LESS example. Objects with depth ranges entirely greater than the stored range can be culled, while those with depths that intersect or have depth values greater than the stored range cannot be culled.

The DCM modes DCM_LESS_EQ and DCM GREATER_EQ are very similar to DCM_LESS and DCM_GREATER respectively, but differ in whether an equality condition is considered to be an intersection of the ranges or not.

For the remaining modes, DCM_ALWAYS, DCM_NEVER, and DCM_NOT EQUAL, it is not possible to use depth based culling. It is clear that there is no comparison of depth values that can be used to indicate whether the object can be culled in these cases.

Notice that four of the DCM modes, (the LESS and GREATER modes) require only one value from each of the ranges, while the test for DCM_EQUAL requires both values from each range.

The DCM_NEVER mode appears to be of somewhat limited usefulness as it will never pass the depth test, and will never be visible in the scene. We have to assume that such objects have been added to the scene for a good reason, and therefore should not be culled. One possible reason would be if the object has a side-effect, such as performing stencil operations. In fact, it is essential that any object that may have side-effects should not be culled.

Handling Changes in Depth Compare Mode

The design of 3D rendering hardware relies heavily on pipelining, which is a technique in which the processing that is required is divided up into a large number of simpler stages. Pipelining increases the throughput of the system by keeping all parts of the hardware busy, and allows results to be issued at the rate achieved by the slowest stage, regardless of the length of the pipeline itself.

Pipelining is a useful technique, and it is essential in the design of high performance rendering systems. However, it presents some problems to the z based culling system, where the culling ideally happens at an early stage in the pipeline, but the ISP depth range generation happens much later. The effect is that of a delay, between determining that an object can be culled, and the time when that object would actually have been rendered in the ISP. Any change in the state of the ISP between the culling test and the actual rendering time could cause the culled object to become visible again, and thus cause an error in the rendered image. The things that can, and will, cause changes in the state of the ISP are the other non-culled objects already in the pipeline.

For an example of a situation in which the delay caused by the pipeline causes a problem, consider a large number of objects with a DCM of DCM_LESS. This is a typical mode for drawing scenes, where objects closer to the viewpoint obscure the view of those further away Now consider a single object in the middle of the scene, with a DCM of DCM_ALWAYS. This situation in shown in FIG. 8, where all objects except 'B' are DCM_LESS, and the object marked 'B' is DCM_ALWAYS. Object 'C' is currently being processed in the ISP, object 'A' is being culled, and there are eight objects (including 'B') at intermediate stages in the pipeline.

As object 'C' is processed, the range of values in the ISP is between 0.5 and 0.6. This is the range that is fed back to the culling unit and used for the culling of object 'A'. Object A has a Z value of 0.8, which when compared with the ISP's Z range, means that it will be culled. Now suppose that object 'B' covers the entire tile, and has a Z value of 0.9. The DCM_ALWAYS mode means that it will replace all the stored depths in the ISP with 0.9, and so object 'A', if it had not been culled, would actually be closer to the viewpoint than the stored object 'B', and should therefore be rendered as a visible object. It can be seen that the use of depth based culling produces incorrect results when the Z range feedback is delayed, either by a pipeline, or for any other reason.

This problem occurs due to the pipeline length between the ISP parameter fetch and ISP depth range generation hardware units, and also due to the delay between processing an object in the Tile Accelerator, and that object being rendered in the ISP. In the latter case the delay is considerably larger, and the problem is exacerbated if the Z range information from the ISP is updated only at the end of each partial render. Solutions to these problems are described below.

In the majority of cases, objects are grouped such that objects with a constant depth compare mode occur in long runs. In a typical application, a single depth compare mode, such as DCM_LESS or DCM_GREATER will account for the majority of the objects in the scene, since it is these modes that allow hidden surface removal to occur. Where other modes are used, these tend to be for special effects purposes, and the objects are few in numbers and are often grouped together at the end of the display list. It is fortunate that delayed Z range feedback is not a problem in the case where the DCM does not change.

Figure 9:
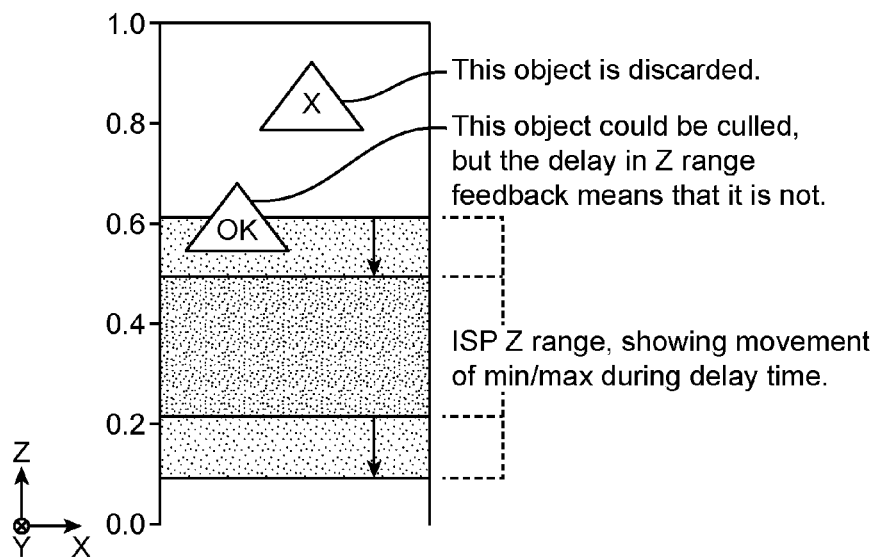
FIG. 9 shows the effect of movement of the depth range during pipeline delay.
Figure 9:

As an example of correct behaviour, consider the case of a number of DCM_LESS objects, shown in FIG. 9. The objects will replace the objects stored in the ISP only if their Z value is less than the currently stored value. This means that the numbers in the ISP can only ever become smaller, and because objects are replaced it is possible that both the minimum and maximum stored depth values will be reduced. The appropriate culling test for a DCM_LESS object is to discard the object if the minimum Z value of the object is greater than the maximum extent of the ISP's Z range. Since the delay can only cause the ISP's maximum value to be larger than it would otherwise be, the culling is safe. Slightly fewer objects will be culled than in the ideal case, but the conservative culling behaviour does not cause errors in the rendered output.

Z Range Culling in the Tile Accelerator

Culling in the Tile Accelerator operates when parameter management is active. That is, when the system begins to render small parts of the screen (called macro tiles) before the whole image has been stored in the display list memory. The rendering of a macro tile is known as a "partial render" and typically renders only a fraction of the number of objects that will eventually be rendered in that macro tile. The parameter management system allows the display list memory associated with the macro tile to be released and used for the storage of further objects. This allows scenes of arbitrary complexity to be rendered in a finite amount of memory space. Parameter management is described fully in UK Patent Application number 0027897.8.

A small amount of memory is used, shown as "Z Range Memory" 14 in FIG. 4, in a feedback loop to store the Z range information generated by the ISP. A separate memory location is used for each tile, and it contains the Z range generated at the end of the partial render that occurred most recently in that tile.

Figure 2:
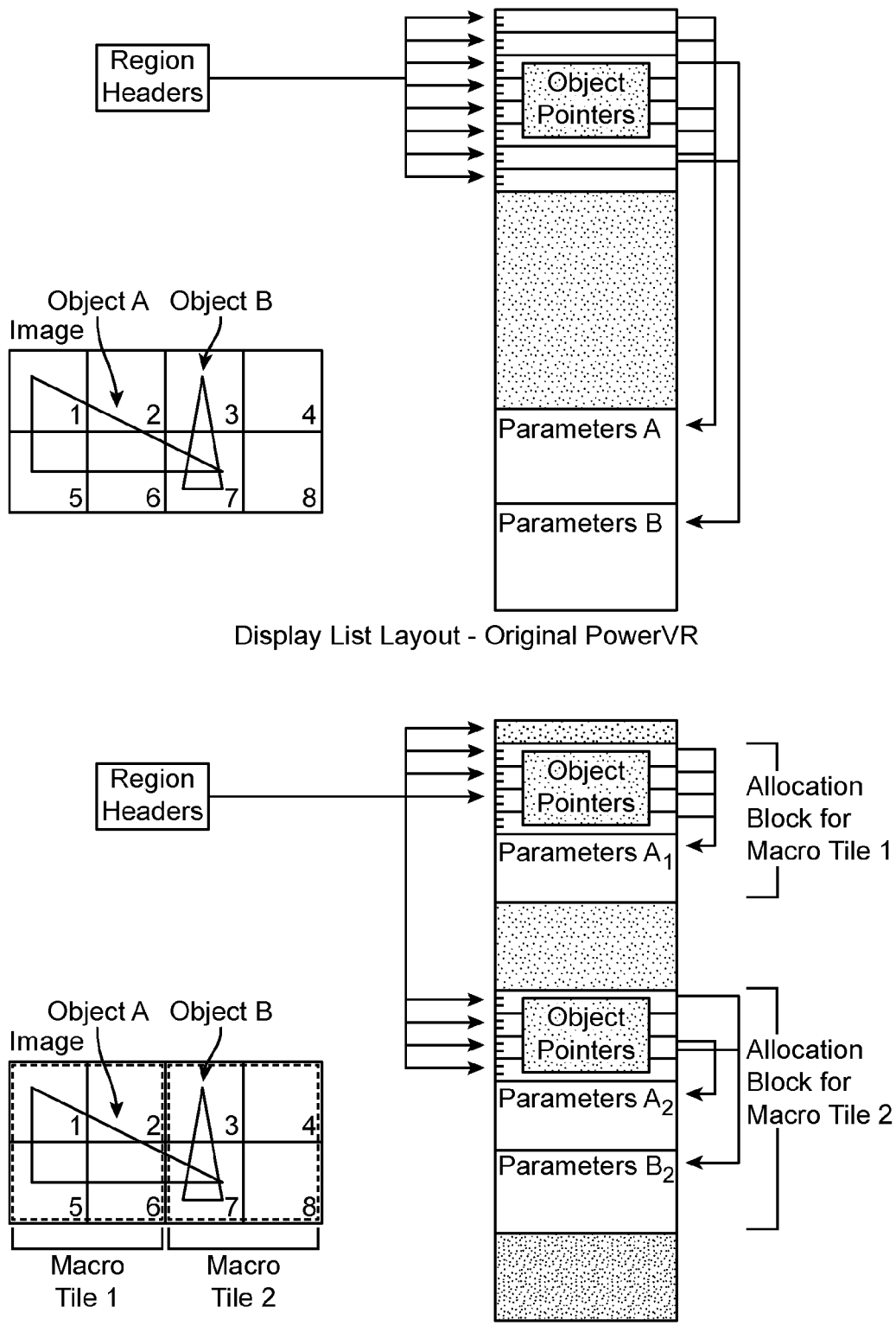
FIG. 2 shows schematically the layout of the display list memory.
Figure 3:
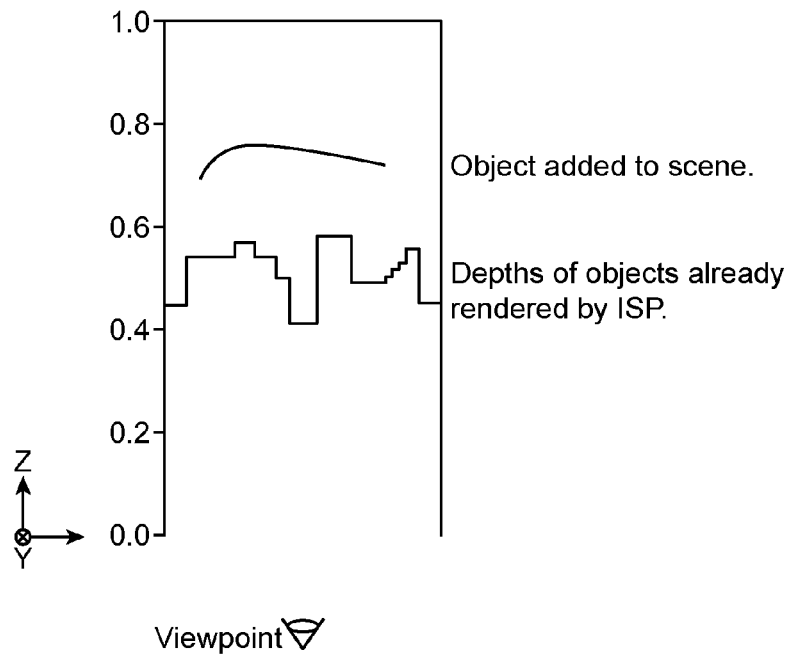
FIG. 3 shows a graph illustrating the differences between previously stored depths and the depth of an incoming object.

The tile accelerator works by calculating the set of tiles in which each object must be rendered, and adding the object to each of those tiles by writing an object pointer into the appropriate list. In a basic system a single copy of the parameter data is written to the display list memory, but in a system using parameter management a copy of the data must be written for each macro tile in which the object is to be rendered. This arrangement is shown in the lower part of FIG. 2.

Z range culling works by reducing the set of tiles to which the objects are added. This is done by comparing the Z range of the object with the stored Z range for the tile, for each tile in which the object occurs. Tiles can then be removed from the set when the test fails. The comparison test must of course be chosen according to the DCM of the object.

The reduction in memory consumption occurs because the reduced set of tiles also tends to use fewer macro tiles, and therefore fewer copies of the object parameter data must be made.

As described above, changes in the depth compare mode have to be dealt with in order to prevent errors occurring. The situation is slightly more complicated than that shown in FIG. 8, because the Tile Accelerator and ISP are unlikely to be working on the same tile at the same time. The parameter management system makes the interval between processing an object in the TA and it being rendered in the ISP unpredictable, and there will be an unknown number of DCM changes stored in the display list.

In order to deal with changes of DCM it is necessary to depart a little from ideal behaviour and update the stored range values in Z range memory 14 from within the TA as objects are processed. The disadvantage of this method is that although the system begins with the range generated by the ISP, the updated range will be a worst case estimate based on the vertex coordinates of all the objects processed by the TA. The range generated in this way will tend to be larger than the range that the ISP would generate itself since it is not possible to take into account objects that overdraw each other. Table 2 shows the range updates required for objects with different DCMs. The stored range cannot shrink, but always grows, and is replaced again by the 'accurate' values from the ISP at the end of the next partial render.

An advantage of this type of operation is that the stored Z range, although larger than necessary, is not delayed by the pipeline, and so changes in DCM do not cause problems.

TABLE 2

Range updates in the TA

| DCM | Condition |
| --- | --- |
| DCM_ALWAYS | Extend range min/max to include object min/max. |
| DCM_NEVER | Do not modify range. |
| DCM_EQUAL | Do not modify range. |
| DCM_NOT_EQUAL | Extend range min/max to include object min/max. |
| DCM_LESS | Extend range min to include object min. |
| DCM_LESS_EQ | Extend range min to include object min. |
| DCM_GREATER | Extend range max to include object max. |
| DCM_GREATER_EQ | Extend range max to include object max. |

Z Range Culling in the ISP Parameter Fetch Unit

Culling objects in the ISP parameter fetch is slightly simpler than culling in the tile accelerator, since the parameter fetch hardware and ISP are always operating on the same tile at the same time. The situation is exactly as illustrated in FIG. 8, and an appropriate comparison on minimum and maximum Z. values can be used to cull objects.

Figure 8:
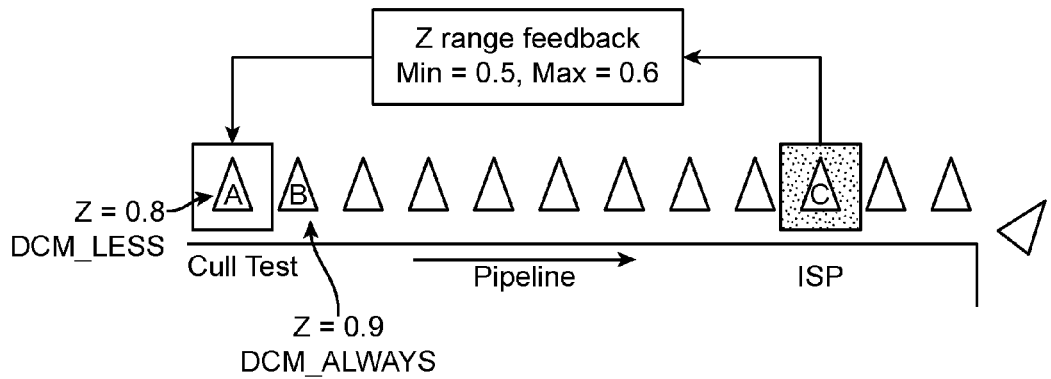
FIG. 8 shows the effect of pipeline delay.

The ISP's Z range values can be taken directly from the Z range generation unit, and fed back to the parameter fetch unit as shown in FIG. 8. The Z range of the object itself is more problematic, since it would defeat the purpose of culling if it were necessary to read the object parameters from memory in order to compute the Z range. Instead, all appropriate information (the Z range and DCM) must be read from the object pointer, by the parameter fetch unit 8.

To store Z range information in the object pointer the range must be computed in the tile accelerator. This is not a problem, since the TA culling stage also requires hardware to compute the Z range, and the same hardware can be used for both purposes.

Free space is scarce in the object pointer word, and it is desirable to keep the length of the word as short as possible. The DCM code requires the storage of three bits. Once the DCM is known, the culling tests for DCM_LESS and DCM_LESS_EQ require only the minimum Z value of the object, and culling tests for DCM_GREATER and DCM_GREATER_EQ require only the maximum Z value of the object. In these cases is therefore possible to store the one value, maximum or minimum, whichever is appropriate to the DCM of the object.

The DCM_EQUAL culling test, as shown in Table 1, does need both values and therefore requires the storage of two depth values in the object pointer. The increase in size of the object pointer necessary to store the second value may not be desirable, particularly since the DCM_EQUAL mode is not commonly used for large numbers of objects. In this case it is possible to perform incomplete culling by performing only one half of the full test, and thus using only one value from the object pointer.

As discussed previously, it is not necessary to store full precision values in the object pointer, provided that care is taken in rounding. Additional space savings can be gained in this way.

To deal with the problem of changing depth compare modes, a simple counter is employed in the parameter fetch unit. The length of the pipeline is known in advance, as is the maximum number of objects which it can possibly contain. In order to ensure correct operation it is required that the triangle being fetched and the triangle being processed in the ISP both belong to one run of triangles, all with the same DCM. The counter is reset to zero when the DCM changes, and is incremented as each triangle is fetched. Culling is disabled when the counter is less than the maximum possible number of objects in the pipeline, thus ensuring that the object in the ISP is part of the same run of objects as the object currently being fetched. Efficiency is reduced slightly because a number of objects at the beginning of each run cannot be culled, but correctness is guaranteed. With a pipeline length of approximately 20 objects, and typical applications in which the DCM does not change frequently, the number of objects that cannot be culled is only a small proportion of the total scene. With scene complexity expected to rise in the future, the resultant reduction in efficiency will become less significant.

The invention claimed is:

1. A graphics renderer for rendering a scene having an image plane divided into a set of one or more tiles, the renderer comprising:
a tiling unit configured to:
receive data for a plurality of objects,
calculate the tiles overlapped by each object,
derive a depth range for each object, and
write for each object an object pointer into per-tile lists stored in a memory only for tiles that are overlapped by the object, each object pointer containing information on the depth range of the object;
a fetch unit configured to:
read the object pointers for objects identified in the tile list for a tile being rendered,
perform a depth range test for each object identified for the tile being rendered to compare the depth range of the object with a received depth range for the tile, and
read, from a memory, parameter data only for objects that pass the depth range test;
a rendering processor configured to render each tile of the set of one or more tiles using the object pointers and parameter data fetched by the fetch unit for each tile to render the scene, wherein the rendering processor is configured to calculate per-pixel depth values for each object rendered as part of rendering a tile; and
a range generation unit configured to compute a depth range for a tile being rendered by the rendering processor that represents the range of depth values for objects that have been processed for that tile, and to feed back computed depth ranges to the fetch unit for the tile being rendered by the rendering processor for use in depth range tests for objects identified in the tile list for that tile.

2. A graphics renderer as claimed in claim 1, wherein the tiling unit is further configured to perform a depth range test for each object by comparing the depth range of the object with a depth range for each tile overlapped by that object, and to write for each object an object pointer into the per-tile lists stored in the memory only for tiles for which the object passes the depth range test at the tiling unit.

3. A graphics renderer as claimed in claim 2, wherein the range generation unit is further configured to feed back computed depth ranges to the tiling unit for use in the depth range test.

4. A graphics renderer as claimed in claim 3, wherein the rendering processor is configured to render the set of one or more tiles by performing multiple partial renders, and the range generation unit is configured to feed back to the tiling unit the depth range computed for a tile only at the completion of a partial render for that tile.

5. A graphics renderer as claimed in claim 1, wherein the range generation unit is configured to compute an updated depth range for a tile each time an object has been processed for that tile.

6. A graphics renderer as claimed in claim 5, wherein the range generation unit is configured to feed back a computed depth range to the fetch unit in response to the depth range being updated.

7. A graphics renderer as claimed in claim 1, wherein the fetch unit is configured to perform the depth range test in dependence on a depth compare mode specifying the conditions an object is to satisfy to pass the depth range test.

8. A graphics renderer as claimed in claim 7, wherein the renderer further comprises a counter configured to increment each time parameter data for an object is read, and the fetch unit is further configured to disable avoidance of reading parameter data for objects that fail the depth range test at the fetch unit when the counter has a value below a specified threshold.

9. A graphics renderer as claimed in claim 8, wherein the renderer is configured to render objects according to a graphics pipeline, and the specified threshold of the counter is equal to the maximum number of objects that can be held in the pipeline.

10. A graphics renderer as claimed in claim 8, wherein the counter is configured to reset in response to a change in the depth compare mode.

11. A graphics rendering method for a scene having an image plane divided into a set of one or more tiles, the method comprising:
receiving data for a plurality of objects at a tiling unit;
calculating the tiles overlapped by each object at the tiling unit;
deriving a depth range for each object at the tiling unit and writing for each object an object pointer into per-tile lists stored in a memory only for tiles that are overlapped by the object, each object pointer containing information on the depth range of the object;
reading at a fetch unit object pointers for objects identified in the tile list for a tile being rendered;
performing at the fetch unit a depth range test for each object identified for the tile being rendered to compare the depth range of the object with a received depth range for the tile and reading, from a memory, parameter data only for objects that pass the depth range test;
rendering each tile of the set of one or more tiles at a rendering processor using the object pointers and parameter data fetched by the fetch unit for each tile to render the scene, comprising calculating per-pixel depth values for each object rendered as part of rendering a tile; and
computing a depth range for a tile being rendered by the rendering processor that represents the range of depth values for objects that have been processed for that tile, and feeding back computed depth ranges to the fetch unit for the the being rendered by the rendering processor for use in depth range tests for objects identified in the tile list for that tile.

12. A method as claimed in claim 11, further comprising:
performing at the tiling unit a depth range test for each object by comparing the depth range of the object with a depth range for each tile overlapped by that object; and
writing for each object an object pointer into the per-tile lists stored in the memory only for tiles for which the object passes the depth range test at the tiling unit.

13. A method as claimed in claim 12, further comprising feeding back computed depth ranges to the tiling unit for use in the depth range test.

14. A method as claimed in claim 13, the set of one or more tiles are rendered by performing multiple partial renders, and the depth range computed for a tile is fed back to the tiling unit only at the completion of a partial render for that tile.

15. A method as claimed in claim 11, further comprising computing an updated depth range for a tile each time an object has been processed for that tile.

16. A method as claimed in claim 15, wherein a computed depth range is fed back to the fetch unit in response to the depth range being updated.

17. A method as claimed in claim 11, wherein the depth range test at the fetch unit is performed in dependence on a depth compare mode specifying the conditions an object is to satisfy to pass the depth range test.

18. A method as claimed in claim 17, wherein the method further comprises incrementing a counter each time parameter data for an object is read, and disabling avoidance of reading parameter data for objects that fail the depth range test at the fetch unit when the counter has a value below a specified threshold.

19. A method as claimed in claim 18, wherein the objects are rendered according to a graphics pipeline, and the specified threshold of the counter is equal to the maximum number of objects that can be held in the pipeline.

20. A method as claimed in claim 18, further comprising resetting the counter in response to a change in the depth compare mode.

* * * * *